(12) United States Patent
Wong

(10) Patent No.: US 10,089,019 B2
(45) Date of Patent: Oct. 2, 2018

(54) MINIMIZING LATENCY FROM PERIPHERAL DEVICES TO COMPUTE ENGINES

(71) Applicant: Advanced Micro Devices, Inc., Sunnyvale, CA (US)

(72) Inventor: Daniel W. Wong, Cupertino, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 105 days.

(21) Appl. No.: 15/386,878

(22) Filed: Dec. 21, 2016

(65) Prior Publication Data

US 2017/0102886 A1    Apr. 13, 2017

Related U.S. Application Data

(63) Continuation of application No. 13/864,628, filed on Apr. 17, 2013, now Pat. No. 9,558,133.

(51) Int. Cl.
| | |
|---|---|
| *G06F 3/00* | (2006.01) |
| *G06F 3/06* | (2006.01) |
| *G06F 13/40* | (2006.01) |
| *G06F 13/12* | (2006.01) |

(52) U.S. Cl.
CPC .......... *G06F 3/0611* (2013.01); *G06F 3/0659* (2013.01); *G06F 3/0685* (2013.01); *G06F 13/122* (2013.01); *G06F 13/4072* (2013.01)

(58) Field of Classification Search
CPC .................................................... G06F 3/0611
See application file for complete search history.

(56) References Cited

U.S. PATENT DOCUMENTS

| | | | |
|---|---|---|---|
| 6,088,740 A | 7/2000 | Ghaffari et al. | |
| 6,185,641 B1 | 2/2001 | Dunnihoo | |
| 6,676,022 B1 | 1/2004 | Guthery et al. | |
| 8,156,415 B1 | 4/2012 | Nguyen et al. | |
| 2013/0235224 A1 | 9/2013 | Park et al. | |

*Primary Examiner* — Henry Tsai
*Assistant Examiner* — Juanito Borromeo
(74) *Attorney, Agent, or Firm* — Volpe and Koenig, P.C.

(57) ABSTRACT

Methods, systems, and computer program products are provided for minimizing latency in a implementation where a peripheral device is used as a capture device and a compute device such as a GPU processes the captured data in a computing environment. In embodiments, a peripheral device and GPU are tightly integrated and communicate at a hardware/firmware level. Peripheral device firmware can determine and store compute instructions specifically for the GPU, in a command queue. The compute instructions in the command queue are understood and consumed by firmware of the GPU. The compute instructions include but are not limited to generating low latency visual feedback for presentation to a display screen, and detecting the presence of gestures to be converted to OS messages that can be utilized by any application.

20 Claims, 6 Drawing Sheets

MINIMIZING LATENCY FROM PERIPHERAL DEVICES TO COMPUTE ENGINES

CROSS REFERENCE TO RELATED APPLICATIONS

This application is a continuation of U.S. patent application Ser. No. 13/864,628, filed Apr. 17, 2013, which is incorporated by reference as if fully set forth.

FIELD

The disclosure is generally directed to computing operations performed in a computing system, and more particularly, to reducing latency from peripheral devices to compute engines in a processing unit.

BACKGROUND

A computing device generally includes a processing unit (e.g., a central processing unit (CPU), a graphics processing unit (GPU), accelerated processing units (APU), or the like), system memory controlled by an operating system (OS), and a display device. Users of the computing device demand high quality graphics and real-time (i.e., ideally zero latency) interactions to be rendered on a display and increasingly faster performance of application programs executed on the computing device. The computing device may be embodied in a traditional personal computer (desktop or notebook), mobile device (tablet, smart phone, e-reader) or embedded in a larger system (e.g., a kiosk, vehicle, etc.)

A peripheral device (e.g., a camera module) connected to the computing device relies on the CPU and system memory to interact with the rest of the computing environment. A peripheral device driver is a software application program running on the CPU that is specific to each peripheral device, and allows the peripheral device to communicate with the rest of the computing device.

In one implementation a peripheral device is used as a capture device and a compute device processes the captured data in an APU environment. An application program executed on the computing device in the implementation incurs significant latency or time delay, e.g., in rendering an image on the display. In some usage scenarios, the latency experienced by users may not meet users' expectations for a real-time, low-latency performance. The excessive latency is not acceptable to users, and needs to be reduced.

One existing solution of a peripheral device with reduced latency, is a mouse device. Mouse-device data (i.e., user movement as input) is input to the computing device and the response in the form of a cursor is output to a display. To meet user expectations, specialized motion input-device support is added to display hardware which can be used within an OS to reduce the latency perceived by a user on the display. Nonetheless, the actual processing of motion input activities by software applications occurs with higher latencies.

BRIEF SUMMARY

Therefore, what is needed is a system, method, and computer program product that substantially reduces latency in the implementation with a peripheral device used as a capture device and a compute device that processes the captured data in a computing environment. The reduced latency opens opportunities for real-time, low-latency applications, such as touch-free human-computer interface (HCI) applications, in an APU environment with minimal latency. Embodiments result in low-latency feedback to a display screen as well as detection and recognition of gestures in captured data to be converted to OS messages that can be utilized by any application.

Existing implementations involve many interactions at the application level among OS components, device drivers, and the application that run on the CPU. The application plays a significant role in configuring devices, processing data captured by the peripheral device, providing instructions to a compute device to offload processing, and then updating the application's windows on a display screen. When the OS is busy with background tasks, the CPU response time and hence the application response time to user inputs varies.

For example, when video data is captured by a camera, there is a noticeable time delay before the captured video is processed by the application and visual feedback is displayed on a screen of a computing device to the user. The excessive latency, degrades performance, forces users to slow down to try to preserve manipulative stability, and the outcome becomes unpredictable. The variable CPU response time is a significant source of latency in application performance that is not acceptable to users.

To reduce the significant latency, some embodiments minimize application level interactions (i.e., reduce device driver and OS overhead) by tightly integrating the devices at the hardware level. The integration causes intelligence to be added to the firmware of embedded processors in the devices. Firmware can be a combination of a programmable and/or persistent memory stored on a memory chip, for example. The intelligence includes pre-packaged, precompiled compute code that is added to the peripheral device firmware and the compute device firmware. In addition, the devices are connected via a common memory pool. The peripheral device can capture data as before in the typical arrangement. However, the peripheral device, due to the augmented abilities in the firmware, now has the ability to provide instructions and data to the compute device via the common memory pool.

Some embodiments include a method, processing unit, and computer-readable storage device that include a processing unit accessing compute instructions and data from a command queue, the compute instructions and data being presented by firmware in a peripheral device, and the processing unit, based on the compute instructions, performing tasks on data captured by the peripheral device and stored in common data buffers, where the accessing and performing occur in an environment including a CPU and a GPU. In an embodiment, the compute instructions, specific to the processing unit, are determined by the firmware in the peripheral device. In some embodiments, the compute instructions include a human-computer interface (HCI) compute function that includes at least one of face tracking, eye tracking, hand tracking, and finger tracking.

In other embodiments, the compute instructions further include generating visual feedback of results of a HCI compute function on a display. The visual feedback can be an overlay on top of regular screen content, and the visual feedback can be presented with per-pixel alpha blending. In other embodiments, the compute instructions further include detecting and recognizing a presence of a gesture.

Further features and advantages, as well as the structure and operation of various embodiments, are described in detail below with reference to the accompanying drawings. It is noted that the disclosure is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments and, together with the description, further serve to explain the principles of the embodiments and to enable a person skilled in the relevant art to make and use the embodiments.

Figure 1:
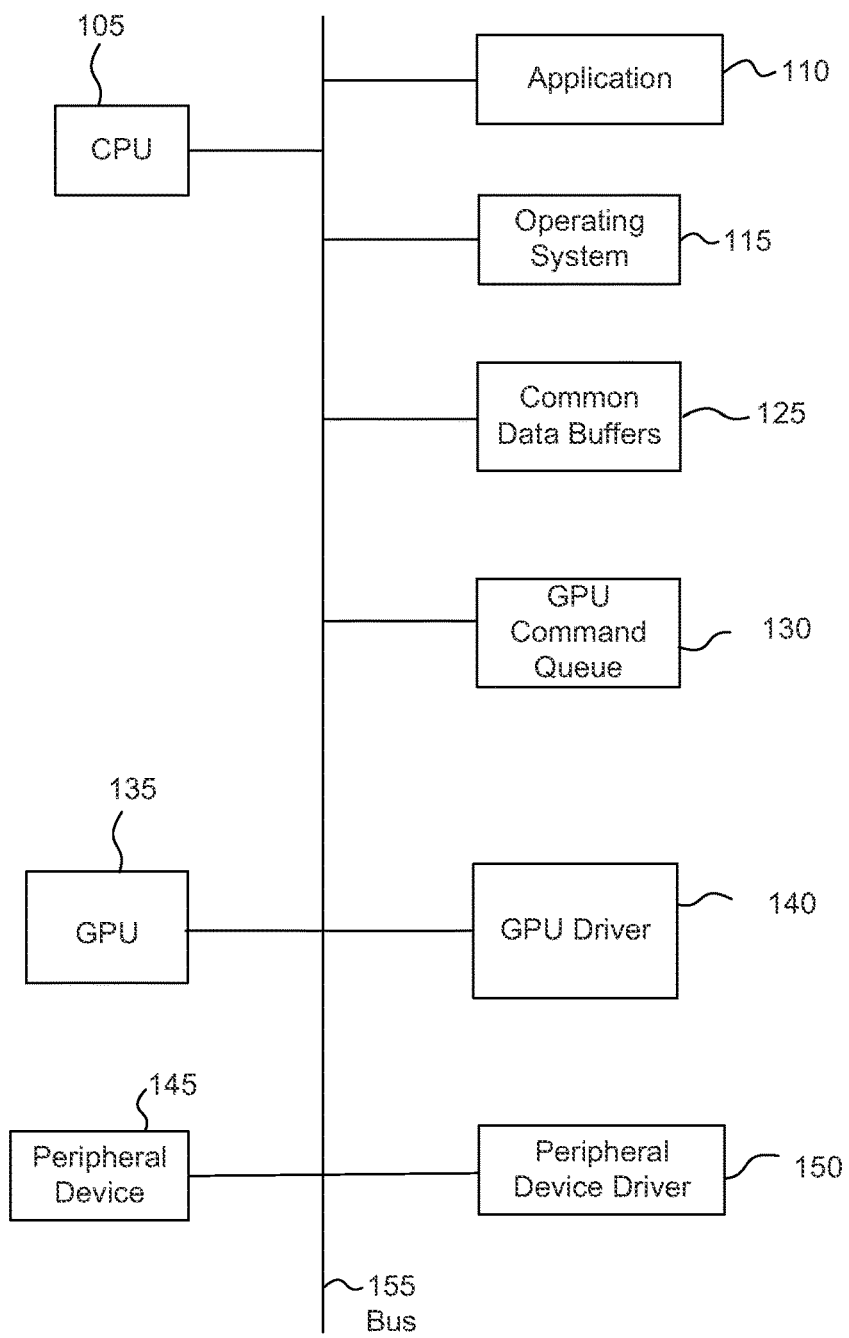
FIG. 1 is a block diagram of a computing system with a peripheral device.

The embodiments will now be described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

The following detailed description refers to the accompanying drawings that illustrate exemplary embodiments. Other embodiments are possible, and modifications can be made to the embodiments within the spirit and scope of the disclosure. Therefore, the detailed description is not meant to limit the scope. Rather, the scope is defined by the appended claims.

It would be apparent to one of skill in the art that the embodiments, as described below, can be implemented in many different embodiments of software, hardware, firmware, and/or the entities illustrated in the figures. Any actual software code with the specialized control of hardware is not limiting. Thus, the operational behavior will be described with the understanding that modifications and variations of the embodiments are possible, and within the scope and spirit of the disclosure.

Computing devices process data and provide many applications to users. Example computing devices include, but are not limited to, mobile phones, personal computers, workstations, and game consoles. Computing devices use a central processing unit ("CPU") to process data. A CPU is a processor which carries out instructions of computer programs or applications. For example, a CPU carries out instructions by performing arithmetical, logical and input/output operations. In an embodiment, a CPU performs control instructions that include decision making code of a computer program or an application, and delegates processing to other processors in the computing device, such as a graphics processing unit ("GPU").

A GPU is a processor that is a specialized electronic circuit designed to rapidly process mathematically intensive applications on electronic devices. The GPU has a highly parallel structure that is efficient for parallel processing of large blocks of data, such as mathematically intensive data common to computer graphics applications, images and videos. The GPU may receive data for processing from a CPU or generate data for processing from previously processed data and operations. In an embodiment, the GPU is a hardware-based processor that uses hardware to process data in parallel.

Due to advances in technology, a GPU also performs general purpose computing (also referred to as GPGPU computing). In the GPGPU computing, a GPU performs computations that traditionally were handled by a CPU. An APU includes functions of a CPU and a GPU. An APU environment provides a unified view of fundamental computing elements. An APU environment allows a programmer to write applications that seamlessly integrate CPUs with GPUs while benefiting from the best attributes of each. GPUs have transitioned in recent years from pure graphics accelerators to more general-purpose parallel processors, supported by standard application programming interfaces (APIs) and tools such as OpenCL®. In an APU environment a programmer can take advantage of the parallel processor in the GPU as a peer or co-processor to the traditional multithreaded CPU. In addition, an APU environment allows CPUs and GPUs to access memory through the same virtual address translation.

In an embodiment, a GPU includes one or more compute units that process data. A compute unit includes arithmetic logic units (ALU's) and other resources that process data on the GPU. Data can be processed in parallel within and across compute units.

In an embodiment, a control processor on a GPU schedules task processing on compute units. Tasks include computation instructions. Those computation instructions may access data stored in the memory system of a computing device and manipulate the accessed data. In an embodiment, the data may be stored in volatile or non-volatile memory. An example of volatile memory includes random access memory (RAM). Examples of RAM include dynamic random access memory (DRAM) and static random access memory (SRAM). Volatile memory typically stores data as long as the computing device receives power. Examples of non-volatile memory include read-only memory, flash memory, ferroelectric RAM (F-RAM), hard disks, floppy disks, magnetic tape, optical discs, etc. Non-volatile memory retains its memory state when the computing device loses power or is turned off.

Users demand high quality graphics, high-speed rendering of graphics, and increasingly faster performance from their computing devices, including mobile computing devices. When a peripheral device connects to a computing device such as a computer system, compute processing may not be necessary. For example, if the peripheral device is a camera and the computing device is a computer system with a CPU and a GPU, for example, the camera can capture and store data in a file format such as JPEG on the computer. The captured data is not processed immediately.

There are also scenarios where a peripheral device is used as a capture device and immediate processing is required to process the captured data in the computer system that includes a CPU and a GPU. One example of that is using camera gestures as a human computer interface. In that scenario, the application plays a major role in configuration and processing to provide visual feedback and interpret the results of the computation to messages understood by the operating system. Applications running in the implementation experience high latency that precludes real-time low-latency applications that meet user expectations.

Because the implementation typically involves many interactions at the application level among the application, OS, and device drivers, a significant time delay occurs that is noticeable to users of the application. The time the CPU takes to respond or perform varies, especially if the OS is busy running background processes. The variable CPU response time due to OS processing is the reason that applications in the implementation can experience high latency between the time the peripheral device captures data and the time the processed captured data results appear on a display device. The high latency in application processing is experienced for example, as visual feedback latency on the display device.

For ease of discussion, and without limitation, examples using a touch-free human-computer interface (HCI) application as the real-time, low-latency application, a camera module as the peripheral device, and a GPU as the compute device is included.

For example, in the implementation with a touch-free HCI application with gesture recognition, an unacceptable visual feedback latency occurs between image capture of a hand or facial gesture by a camera and processing by a processing unit to generate a visual feedback on a screen. The excessive latency degrades performance, (e.g., users may experience a noticeable lag in the feedback on the display), forces users to slow down to try to preserve manipulative stability, and the process becomes unnatural. The excessive latency is not acceptable to users, and thus, needs to be reduced.

Touch screen displays on many mobile computing devices run HCI applications that also experience high latencies. The latencies are due to OS and software driver interactions running on a CPU, but because there is only one peripheral device that is used for both input and output, the touch screen, the latency is not as noticeable to users. Thus, low latency HCI is not essential to touch screen displays.

FIG. 1 is a block diagram of a computing system 100 with a peripheral device. In the example shown, computing system 100 includes an APU environment and supports the implementation. In various examples, computing system 100 may comprise a supercomputer, a desktop computer, a laptop computer, a video-game console, an embedded device, a handheld device (e.g., a mobile telephone, smart phone, MP3 player, a camera, a GPS device, or the like), or some other device that includes or is configured to include a processing unit or a plurality of processing units.

System 100 includes CPU 105, GPU 135, peripheral device 145, bus 155, and the following that reside in system memory: application 110, operating system (OS) 115, common data buffers 125, GPU command queue 130, GPU driver 140, and peripheral device driver 150.

Peripheral device 145 can be any device that can capture data. Examples include, but are not limited to, a camera that captures data such as images and video, and a microphone that captures audio data.

Common data buffers 125, such as a ring buffer, and GPU command queue 130 are located in user address space. Common data buffers 125 are configured to be shared between and accessible by different devices such as GPU 135 and peripheral device 145. GPU command queue 130 is polled or sampled by GPU 135 to obtain compute instructions for processing data captured in common data buffers 125. GPU 135 can also be notified by a job submitter to pick up compute instructions in GPU command queue 130.

Although computing system 100 is shown comprising two processing units, it is to be appreciated that this is for illustrative purposes only, and not limitation. In general, a system in accordance with an embodiment may include one or more processing units, including different types of processing units such as a CPU, GPU, APU, application-specific integrated circuit (ASIC) controller, other similar types of processing units, or a combination thereof. In addition, each processing unit may comprise one or more compute units. In an embodiment, two processing units are a GPU and a CPU.

In the example, CPU 105, application 110, OS 115, common data buffers 125, GPU command queue 130, GPU 135, GPU driver 140, peripheral device 145, and peripheral device driver 150 are connected via bus 155. Bus 155 may be any type of communication infrastructure used in computer systems, including a peripheral component interface (PCI) bus, a memory bus, a PCI Express (PCIE) bus, front-side bus (FSB), hypertransport (HT), or another type of communication structure or communications channel whether presently available or developed in the future.

Figure 2:
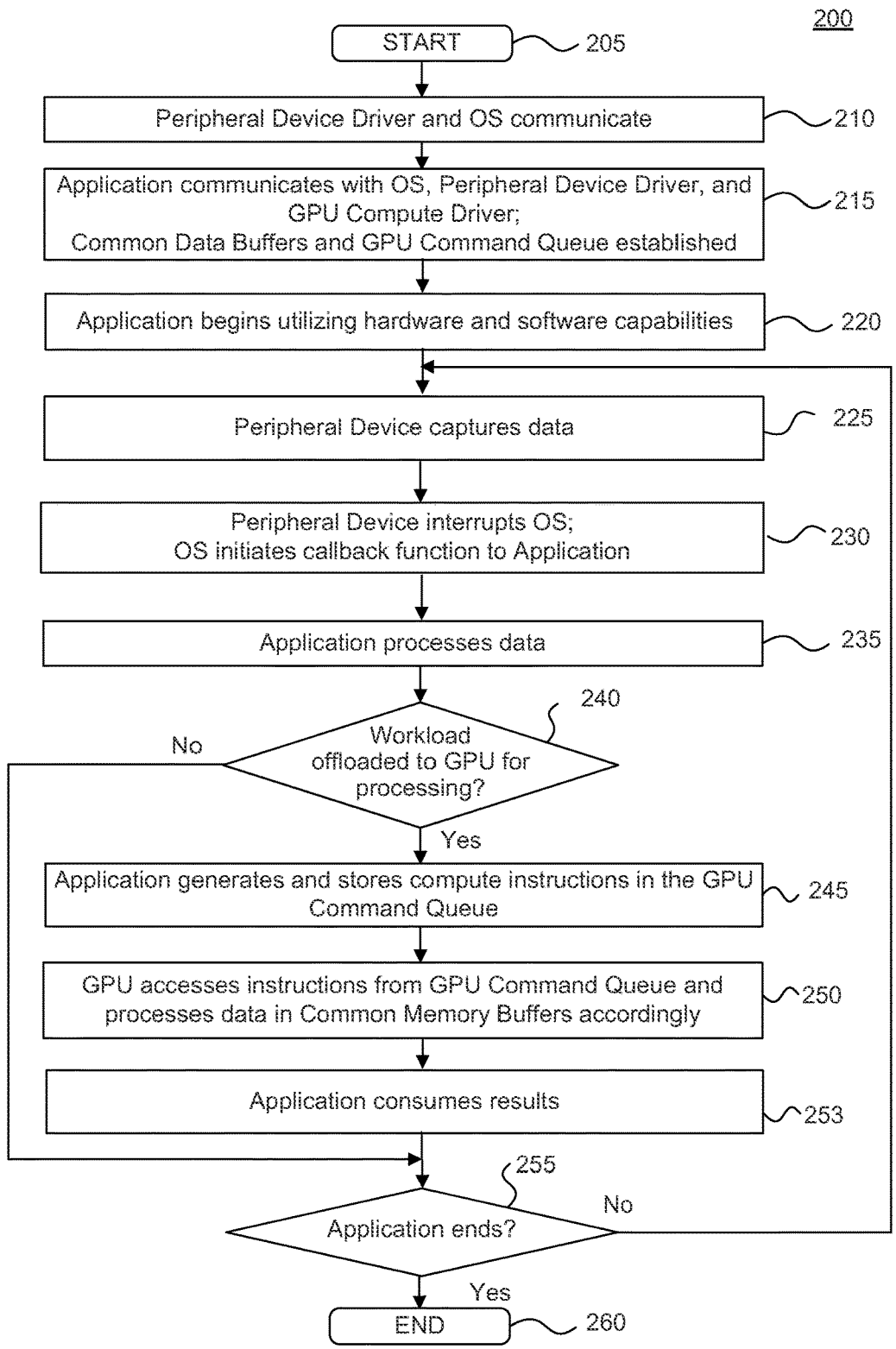
FIG. 2 is a flow chart depicting the implementation in a method.

FIG. 2 is a flow chart depicting the implementation method. In one example, system 100 may be used to perform method 200.

In the example, peripheral device 145 and GPU 135 do not have tight integration so peripheral device 145 cannot communicate with GPU 135 via GPU command queue 130. Instead, application 110 determines if GPU 135 computation is needed, as well as determines and stores the compute instructions for GPU 135 in GPU command queue 130. In addition, application 110 with assistance from drivers 140 and 150 as well as OS 115, configures buffers and updates application 110's windows on a display screen. These activities occur with variable latencies due to the variable CPU response times.

It is to be appreciated that operations in method 200 may be performed in a different order than shown, and method 200 may not include all operations shown. For ease of discussion, and without limitation, method 200 will be described in terms of elements shown in FIG. 1. In addition, an example of OS 115 being a Windows® OS with an AVStream multimedia class driver that streamlines video data capture from a camera module as peripheral device 145, into user mode applications such as touch-free HCI application with gesture recognition as application 110, is also described. AVStream multimedia class driver provides two interfaces, a pin interface that connects to hardware and a filter interface that connects to software.

The method begins at step 205 and proceeds to step 210.

In step 210, peripheral device 145 connects to computing system 100. OS 115 detects peripheral device 145 and establishes communications with Peripheral device driver 150.

In an example, a camera module (145) connects to a USB port of computing system 100. Windows OS (115) detects camera module (145) and camera driver (150) connects to the AVStream pin interface in Windows OS (115). A "Pin" in Windows topology refers to an access point to a source or sink device (or resource). In the example, the camera module (145) is a data source.

In step 215, application 110 communicates with OS 115, peripheral device driver 150, and GPU driver 140 to establish common data buffers 125 and GPU command queue 130. For substantially improved performance, peripheral device 145 can be configured to capture and store data directly into the common data buffers 125, which can be page mapped to allow direct access from GPU 135 without any additional buffer copying operations. Peripheral device 145 is now using common data buffers 125 for storing captured data, while GPU 135 can process captured video data directly from the same set of common data buffers 125.

Application 110 communicates with OS 115 to register a callback function. The callback function is executed by components in OS 115 to notify application 110 when data captured by peripheral device 145 is available for processing. For compute offload, application 110 will establish GPU command queue 130 for the submission of compute jobs. Configuration is now complete.

In the example, touch-free HCI application with gesture recognition (110) communicates with Windows OS (115), camera driver (150), and GPU driver (140) to establish common data buffers 125 and GPU command queue 130. Camera module (145) is configured to write to common data buffers 125. In the example, touch-free HCI application with gesture recognition (110) connects to an AVStream interface in Windows OS (115) to register the callback function. GPU 135 can access common data buffers 125 and is aware of GPU command queue 130. GPU 135 may begin sampling or polling GPU command queue 130 for instructions.

In step 220, application 110, touch-free HCI application with gesture recognition (110) in the example, begins, i.e., begins to utilize hardware and software capabilities.

At step 225, peripheral device 145 captures and stores data in common data buffers 125. In the example, camera module (145) captures and saves gestures of a user as video data in common data buffers 125. An example of a gesture can be a vertical finger movement.

At step 230, peripheral device 145 issues an interrupt to OS 115 and OS 115 initiates the callback function to application 110 indicating that data is ready for processing. In the example, camera module (145) notifies Windows OS (115) that video data is ready for processing. Windows OS (115) informs the AVStream filter component that initiates the callback function to alert touch-free HCI application with gesture recognition (110) that data is ready for processing.

At step 235, application 110, processes the data stored in common data buffers 125. In the example, touch-free HCI application with gesture recognition (110) processes data to detect the presence of recognizable gestures such as the vertical finger movements.

At step 240, a determination is made whether the workload can be offloaded to another processing unit such as GPU 135.

If the workload cannot be meaningfully offloaded to another processing unit, application 110 completes processing the stored video data, and method 200 proceeds to step 255.

If the workload can be offloaded to another processing unit such as GPU 135, at step 245, application 110 submits compute functions that are typically written in a high level compute language like DirectCompute and OpenCL. GPU driver may compile and store the compiled compute instructions in GPU command queue 130.

In the example, if touch-free HCI application with gesture recognition (110) chooses to offload parallel workload to GPU 135 during the gesture recognition process, touch-free HCI application compute functions are compiled and stored in GPU command queue 130.

At step 250, GPU 135 accesses instructions from GPU command queue 130 and processes the data stored in common data buffers 125 accordingly. The processing result is sent to application 110.

At step 253, when a gesture is detected, application 110 performs the corresponding action. In the example, when a gesture is detected, touch-free HCI application with gesture recognition (110) converts the detected vertical finger movement into operations associated with the intended command. An example intended command may be a mouse click, or a keyboard action. Touch-free HCI application with gesture recognition (110) updates a corresponding application window(s) to provide visual feedback to inform the end user that the intended command has been carried out.

At step 255, a determination is made whether application 110 ends. Application 110 can end as the result, for example, of inaction over a given period. If application 110 does not end, method 200 returns to step 225 and the process repeats as long as peripheral device 145 captures new data. If application 110 ends, application 110 de-registers the callback with OS 115 and the process terminates at step 260.

As would be known by one skilled in the art, application 110, OS 115, GPU driver 140, and peripheral device driver 150 run on CPU 105. Thus, method 200 involves CPU processing during the configuration steps 210 through 215, steps 230 through 245, and step 253 involving capturing and processing data. In addition, OS 115 processing takes place during configuration in steps 210-215, when data is captured in step 230, and in step 253 to convert the detected gesture to an action. As discussed earlier, the variable CPU response time and hence the latency in completing the steps, cannot be guaranteed. For example, when the kernel, the main component of OS 115, is busy with other background tasks, the CPU processing times for steps 230 to 245 will vary.

The latency between the time the gesture is presented to and captured by the camera module (145) at step 225 and the time the corresponding application window is updated, thereby providing visual feedback on a display, at step 253 is typically in the order of 100 ms, too long to allow for an acceptable HCI mechanism for many end users.

Some embodiments take advantage of embedded processors in peripheral devices and compute devices to achieve low latency. In particular, intelligence is added to the firmware of a peripheral device and the firmware in a GPU, to achieve a tight integration to avoid excessive or unpredictable latency. Thus, the peripheral device and the GPU will share corresponding precompiled compute code at the hardware/firmware level so they essentially speak the same language, and will be able to communicate via common memory buffers. The interactions at the hardware/firmware level are substantially improved as they do not involve application level interactions among the OS, device drivers, and application after data capture through captured data processing. In contrast to the typical implementation described in method 200 of FIG. 2, the latency in the implementation with tight integration between the peripheral device and the GPU is shorter and more predictable. The embodiments open opportunities for real-time low latency applications, such as new touch-free HCI applications, to meet or exceed user expectations and requirements. For example, captured video data can be processed to enable low-latency visual feedback on a display screen, as well as low-latency interpretation of the captured data converted to OS messages that can be utilized by any application even though the messages are generated by a camera.

Figure 3:
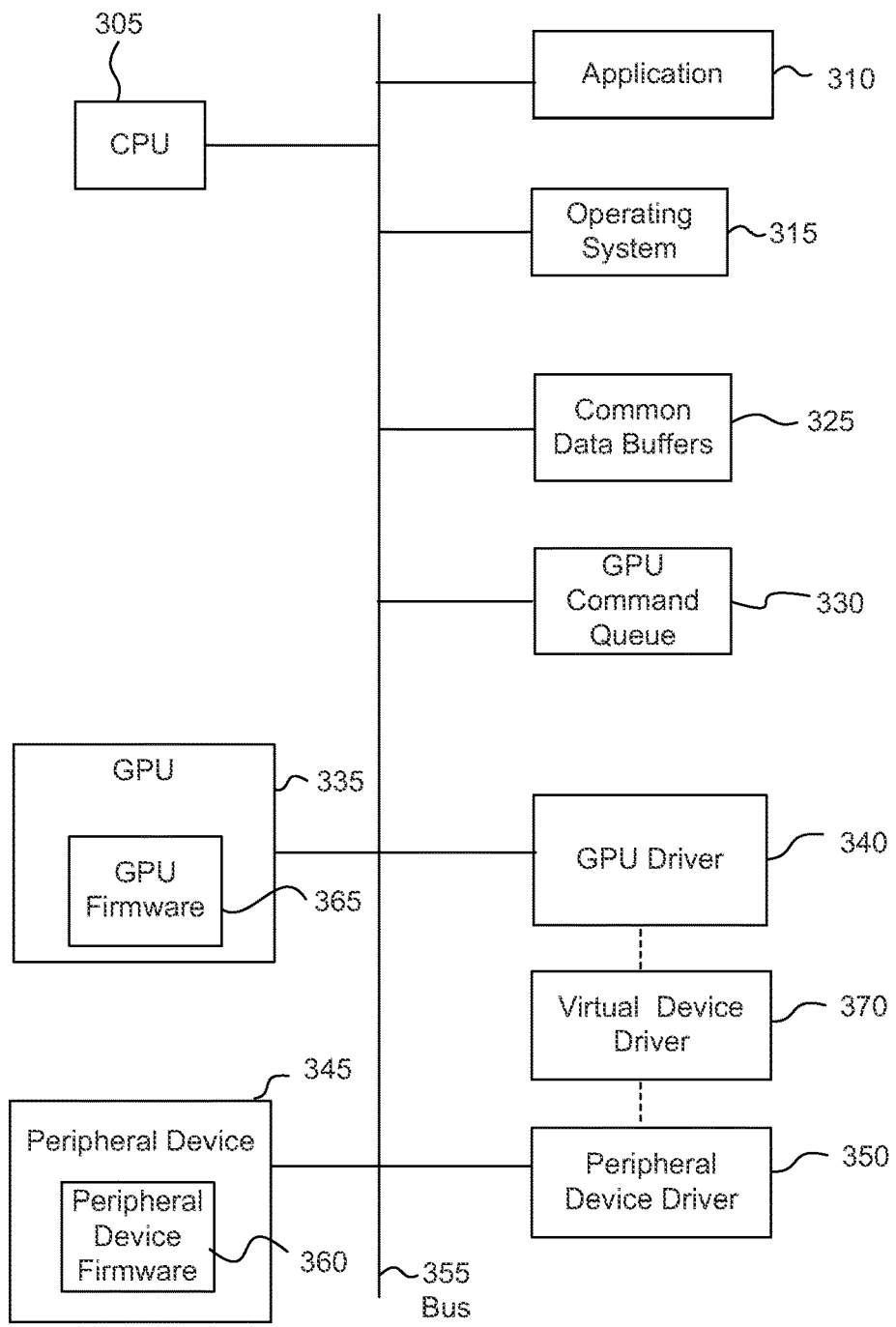
FIG. 3 is a block diagram of a computing system with a peripheral device in accordance with an embodiment.

FIG. 3 is a block diagram of a computing system with a peripheral device, in accordance with an embodiment. For example, system 300 supports the implementation with tight integration and is configured to minimize the variable CPU response time or latency introduced by OS 315, GPU driver 340 and peripheral device driver 350 interactions. In the example shown, the elements of computing system 300 include similar elements as computing system 100 shown in FIG. 1, with the addition of peripheral device firmware 360, GPU firmware 365, and virtual device driver 370.

In embodiments, peripheral device 345 and GPU 335 are tightly integrated and communicate at a hardware/firmware level. With the added intelligence, peripheral device firmware 360 can determine compute instructions specific to GPU 335, to be stored in GPU command queue 330 that are understood and consumed by GPU firmware 365. The compute instructions include but are not limited to generating visual feedback for presentation to a display screen, and detecting the presence of gestures.

In some embodiments, gesture recognition is a system level service that is independent of a specific application, i.e., the tight integration combined with a virtual device driver 370 results in gesture recognition and conversion of the detected gestures to OS messages that can be utilized by any application. This is in contrast to method 200 which is specific to application 110, i.e., the results of the gesture recognition is used only by application 110 that orchestrates the gesture recognition process.

Virtual device driver 370 is a software application that becomes available due to the tight integration of the underlying devices, namely, peripheral device driver 345 and GPU 335. When GPU driver 340 detects the presence of peripheral device 345 that supports the implementation with tight integration (e.g., supports gesture capture), a virtual device driver 370 is identified to OS 315 as a child device of the GPU driver 340, and can appear as a device to OS 315 including but not limited, to a computer mouse or keyboard.

In the gesture recognition example, the combination of GPU driver 340 and peripheral device driver 350 initialize virtual HCI driver (370). Once loaded and initialized, virtual HCI driver (370) can translate detected gestures into OS messages that are understood by OS 315. Thus, any application can use the OS messages even though they originated as a gesture captured by a camera, i.e., the implementation using a peripheral device as camera capture and compute device is transparent to the application using the resulting OS messages.

All other elements shown in FIG. 3 can operate similarly to related elements found in computing system 100, as discussed above.

Figure 4:
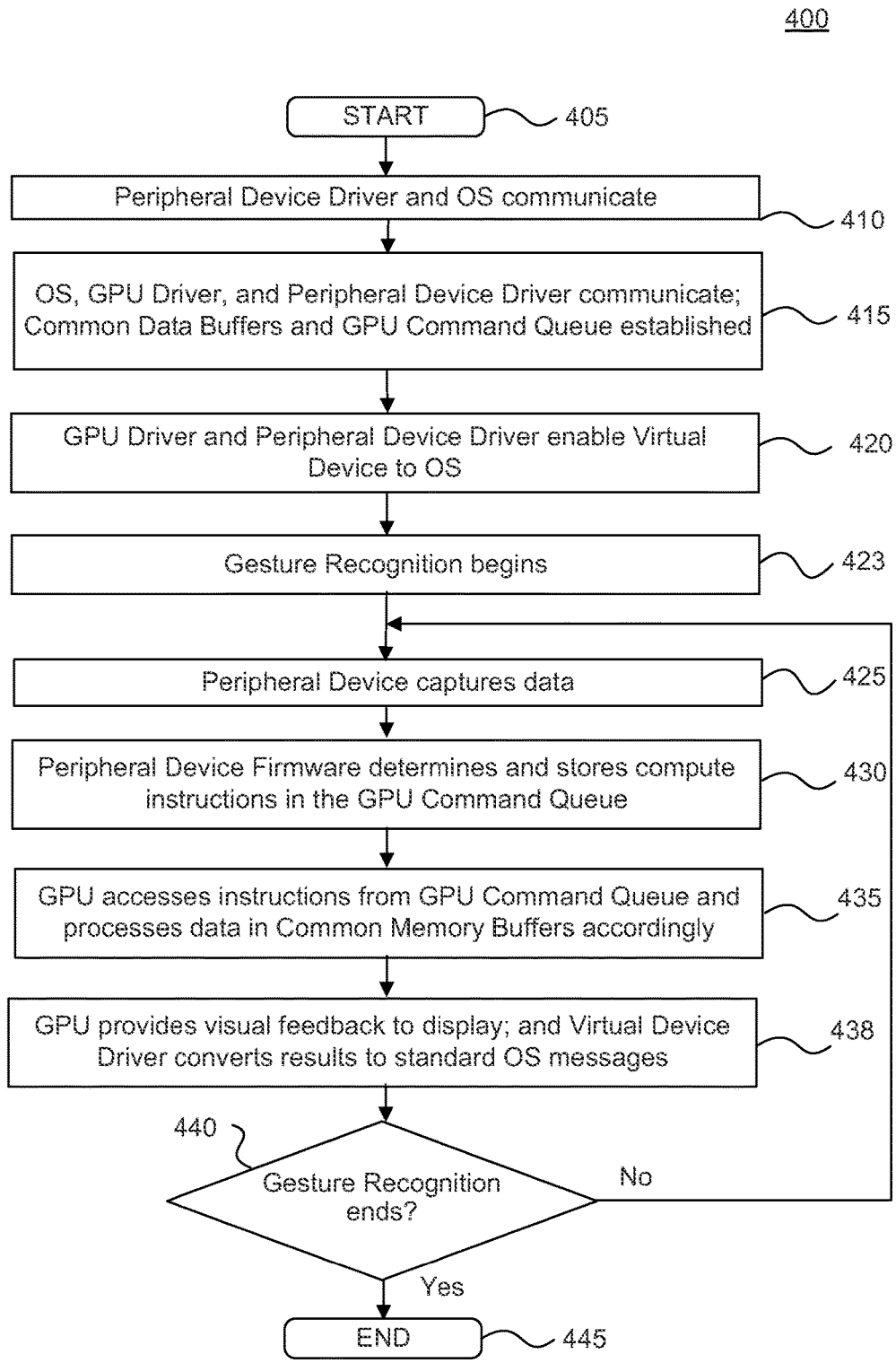
FIG. 4 is a flow chart depicting the implementation in a method according to an embodiment.

FIG. 4 is a flow chart depicting the implementation in a method, according to an embodiment. For example, method 400 may be used for minimizing latency introduced by OS and device drivers in the implementation with tight integration. In one example, system 300 may be used to perform method 400.

It is to be appreciated that operations in method 400 may be performed in a different order than shown, and method 400 may not include all operations shown. For ease of discussion, and without limitation, method 400 will be described in terms of elements shown in FIG. 3. For illustrative purposes, and not limitation, an example with OS 315 being a Windows® OS with an AVStream multimedia class driver that streamlines video data capture from a camera module as peripheral device 345, to be available for gesture recognition processing, is also described.

The method begins at step 405 and proceeds to step 410.

At step 410, OS 315 detects peripheral device 345 and establishes communications with peripheral device driver 350. In an example, a camera module (345) connects to a USB port or a camera interface of computing system 300; Windows OS (315) detects camera module (345), and camera driver (350) connects to the AVStream pin interface in Windows OS (315).

At step 415, OS 315, components of GPU driver 340 and peripheral device driver 350 establish required common data buffers 325 for data capture and storage by peripheral device 345, and GPU command queue 330, for submitting commands to GPU device 335. GPU 335 samples GPU command queue 130 for instructions to consume captured data in common data buffers 325 and detect events.

For substantially improved performance, peripheral device 345 is configured to capture and store data directly into the common data buffers 325 without any additional buffer copying operations. Peripheral device firmware 360 is now aware of common data buffers 325 including location, type of buffer, and size, for storing captured data for GPU 335 to process. GPU firmware 365 will sample the command queue to obtain outstanding compute jobs.

At step 420, components in GPU driver 340 interact with peripheral device driver 350 to enable virtual device driver 370 to OS 315. In the example, GPU driver 340 can interact with camera driver (350) to enable a virtual mouse device (not shown) to OS 315.

In one example, configuration is complete, and further interactions among peripheral device driver 350, OS 315, and GPU driver 340 are unnecessary.

At step 423, gesture recognition begins. Note that gesture recognition is a system level service that is not tied to a specific application, in contrast to method 200 which is specific to application 110.

At step 425, peripheral device 345 captures and stores video data in common data buffers 325. In the example, a camera module captures and stores video data in common data buffers 325.

At step 430, peripheral device firmware 360 determines and stores compute instructions and data specific to GPU 335, in GPU command queue 330. Because of the tight integration, the compute instructions from peripheral device firmware 360 are specifically tailored to GPU firmware 365 at the hardware/firmware level. This is in contrast to step 245 of FIG. 2, where application 110 provides intermediary processing and communications at the application level between peripheral device 145 and GPU 135 of FIG. 1.

For example, the compute instructions can include the set of HCI compute programs compiled at runtime by application 110 at step 245 in FIG. 2. Peripheral device firmware 360 can be packaged with several pre-compiled HCI compute programs including but not limited to, compute codes for face tracking, eye tracking, hand tracking, and finger tracking Depending on the nature of the HCI application needed at runtime, peripheral device firmware 360 can decide at runtime which subset of the pre-compiled HCI compute programs or compute codes is presented to compute device, GPU 335. For example, an implementation can choose to default to finger tracking, but can be configured by application 310 to track for other features on demand. In another implementation, a small control utility is provided to allow the user to enable and disable the gesture recognition, to switch the gesture recognition to operate in a desired mode, and to tune the sensitivity to suit personal preferences. For instance, a user can switch the gesture recognition service to operate in hand tracking mode. In addition, the user can configure the gesture recognition service to look for small hands such that a young child can interact with the computing device through hand tracking.

Peripheral device 345 does not execute or consume any of the pre-compiled HCI compute programs or compute codes. Thus, peripheral device 345 treats the pre-compiled HCI compute programs or compute codes as data and stores an applicable subset in GPU command queue 330 for GPU 335 to consume.

In the example, camera firmware (360) provides compute instructions and associated data in GPU command queue 330 for GPU 335 to consume. Associated data may include for example, data such as pointers and addresses for locating capture data in common data buffers 325, and the location of compute results.

At step 435, GPU 335 accesses the compute instructions and associated data that are specific to GPU 335, from GPU command queue 330, and processes the captured data such as video data in common data buffers 325, based on the compute instructions and associated data. For instance, the compute instructions may track finger motions in the captured video data.

In an embodiment, the compute instructions include tasks as well as embedded priority and dependency information. There may be several levels of priority, such that higher level priority tasks are scheduled to be completed first. For example, GPU 335 schedules tasks based on the priority information so that the highest priority tasks, such as real-time tasks, are completed before tasks with lower priority that are not time-sensitive. An embodiment further includes scheduling, by the processing unit such as GPU 335, the tasks based on priority information in the compute instructions. In another embodiment, real-time tasks have a highest priority.

At step 438, when motion tracking is successful, the compute instructions can further render low-latency visual feedback and overlay that on the display. Additionally, a hardware interrupt can be issued to the OS 315 that causes analysis of motion tracking results, and virtual device driver 370 to convert a recognized supported gesture into corresponding messages that OS 315 natively supports. Thus, many application on OS 315 platform can utilize the messages. This is in contrast to the typical implementation at step 253 of method 200 of FIG. 2. At step 253, application 110 processes the detected gestures and converts them to respective actions. The processing and visual feedback latency in method 200 is so high that application 110 will not meet users' expectations. In addition, the detected gestures are utilized by application 110 rather than being converted to standard OS messages for use by other applications.

Figure 5:
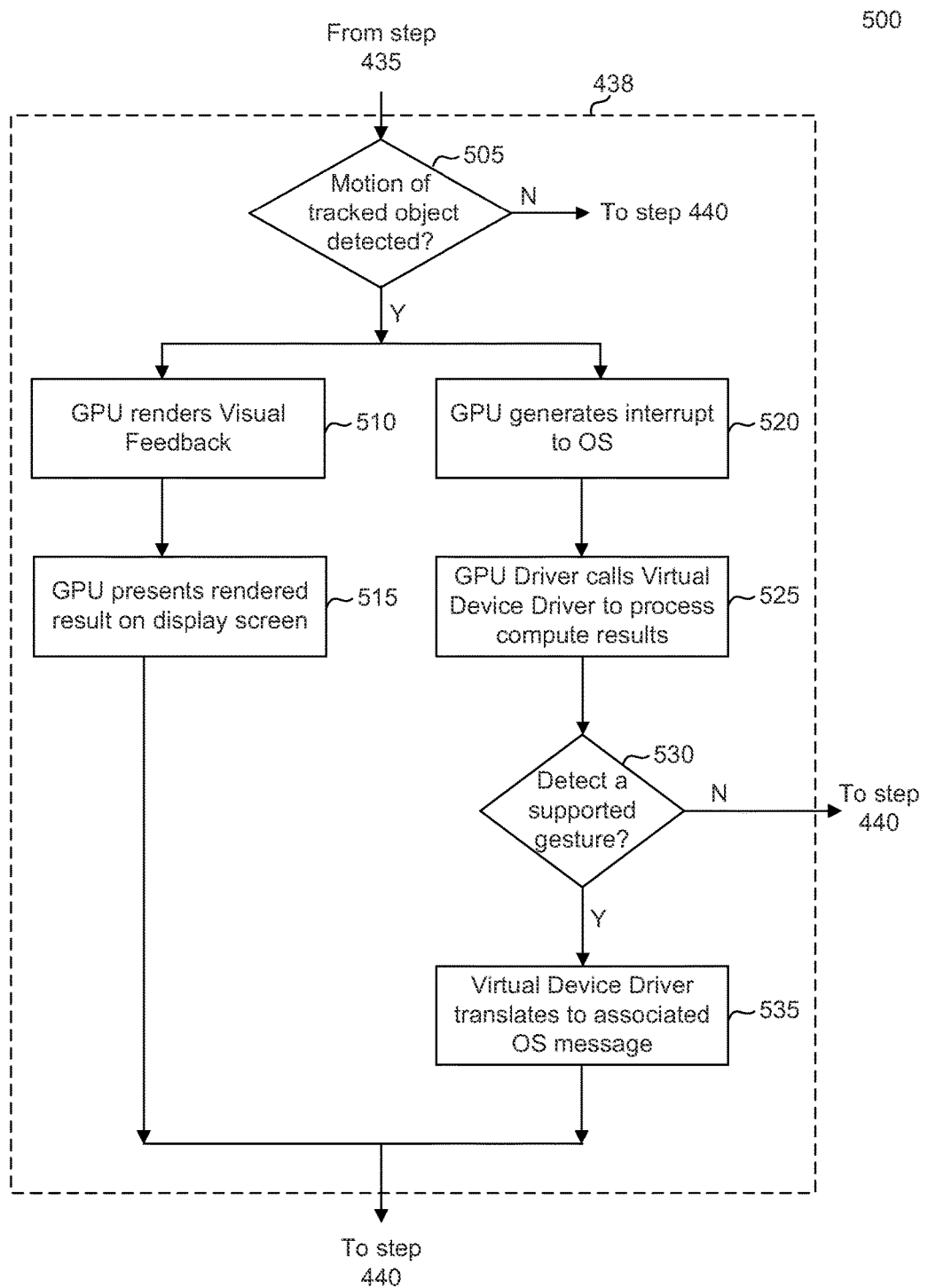
FIG. 5 is a flow chart depicting step 438 of FIG. 4, according to an embodiment.

Step 438 is further described in FIG. 5.

At step 440, a determination is made whether the need for gesture input ends or not. Gesture recognition can be terminated by the user through a control utility or by the gesture recognition service itself when no tracked object(s) is detected for a settable period of time. If gesture recognition does not end, method 400 returns to step 425 and the process repeats as long as peripheral device 345 captures new data. If gesture recognition ends, the virtual device driver 370 becomes inactive at step 445. Gesture recognition can resume due to user actions, either through a control utility or through application 310, for example.

System 300 and method 400 allow application 310 or any application that utilizes OS 315 platform (i.e., recognizes OS 315 messages) to continue to interact with peripheral device driver 350 and OS 315 in the same manner as described in FIG. 2, i.e., the tight integration between peripheral device 345 and GPU 335 is transparent to the rest of system 300.

The tight integration of the firmware in peripheral device 345 and GPU 335 obviates the need for application 310 to orchestrate the gesture processing pipeline. In particular, application 310 is not involved in configuration steps 410-420, nor in processing captured data or providing instructions in steps 430-438, which is in contrast to method 200. Further, after configuration steps 410-420, OS 315 is not involved until a gesture is recognized and converted to an OS supported message at step 438.

The time lapse or latency between the time peripheral device 345 generates and stores data in common data buffers 325 at step 425, and the time GPU 335 processes the data in step 435 in computing system 300 and presents visual feedback on the screen, is substantially less than the latency between steps 225 and steps 250 of computing system 100. The latency is shorter and more predictable.

Additionally, or alternatively, a similar method may be applied to other applications including but not limited to other types of HCI applications such as facial recognition, eye detection, and limb detection, as well as stereo image processing, and audio processing.

FIG. 5 is a flow chart depicting step 438 of FIG. 4, according to an embodiment. For example, method 500 may illustrate how compute instructions result in low latency visual feedback generation as well as how compute instructions result in low-latency gesture messages being presented to an OS. In one example, system 300 may be used to perform method 500.

It is to be appreciated that operations in method 500 may be performed in a different order than shown, and method 500 may not include all operations shown. For ease of discussion, and without limitation, method 500 will be described in terms of elements shown in FIG. 3. For illustrative purposes, and not limitation, an example with a real-time low latency touch-free HCI application with gesture recognition as application 310 and a camera module as peripheral device 345 is also described.

The method begins at from step 435 of FIG. 4 and proceeds to step 505.

At step 505, a determination is made whether compute instructions executed on a portion of data, or a frame of data has detected motion of a tracked object, e.g., tracking a finger motion. If motion has not been detected, method 500 continues to step 440 of FIG. 4.

If execution of compute instructions has detected tracked motion, method 500 branches to step 510 to generate low latency visual feedback, and step 520 to notify virtual device driver 370 to examine the compute results.

At step 510, based on compute instructions, GPU 335 will proceed to provide low-latency visual feedback to a display by rendering frames of potential gesture trajectories being traced. Low latency visual feedback can be a rendered animation showing tracked moving object(s) in progress such as a vertical finger movement, and assures the user that a potential gesture is being tracked by system 300. When the rendering of each animation frame is done, method 500 continues to step 515.

At step 515, according to compute instructions, GPU firmware 365 presents the rendered result as an animation on a display screen, potentially as an overlay on top of regular screen content with proper per-pixel alpha blending. Per-pixel alpha blending would for example, allow the visual feedback to appear as a transparent overlay (e.g., a visual image or video of the traced gesture) on top of the regular screen content on the display screen. Method 500 continues to step 440 of FIG. 4.

At step 520, based on compute instructions GPU 335 generates a hardware interrupt to OS 315. OS 315 recognizes the interrupt as coming from GPU 335 and will forward the interrupt to GPU driver 340.

At step 525, based on the data structure, e.g., an identifier that signifies an HCI compute function associated with the interrupt, GPU driver 340 will call its child virtual device driver 370 to process the compute results. For example, virtual device driver 370 may include functions to combine the motion tracking results produced by compute in step 435 over a time period to determine that several frames of the tracked motion of a specific finger form a mouse click gesture.

At step 530, a determination is made whether virtual device driver 370 detects the presence of a supported gesture. If a supported gesture is not detected, which is the case for most of the time, method 500 continues to step 440 of FIG. 4.

If a supported gesture is detected, at step 535, the supported gesture is presented to OS 315 as a message native to OS 315. For example, the mouse click gesture is translated by virtual HCI device driver (370) to the associated native OS 315 message such as a mouse click message. Thus, application 310 designed as a real-time low latency touch-free HCI application, or any application, can readily utilize the mouse click message as if the message was from a physical mouse device, even though the message originated as a gesture captured from a camera.

Method 500 continues to step 440 of FIG. 4.

Figure 6:
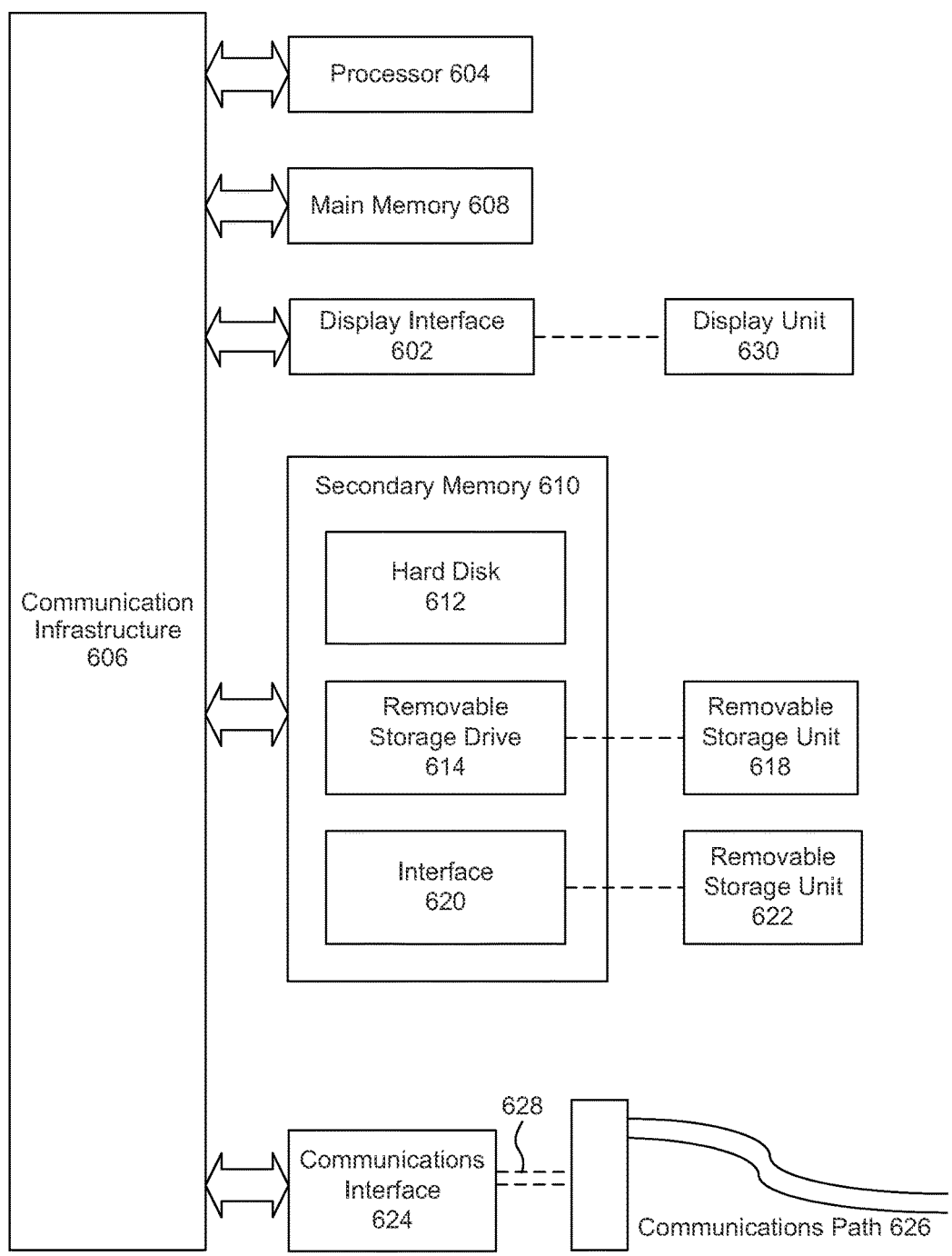
FIG. 6 illustrates an example computer system in which some embodiments may be implemented.

Various aspects of the disclosure can be implemented by software, firmware, hardware, or a combination thereof. FIG. 6 illustrates an example computer system 600 in which some embodiments, or portions thereof, can be implemented as computer-readable code. For example, the methods 200 and 400 of FIGS. 2 and 4 can be implemented in system 600. Various embodiments are described in terms of example computer system 600. After reading the description, it will become apparent to a person skilled in the relevant art how to implement the embodiments using other computer systems and/or computer architectures.

Computer system 600 includes one or more processors, such as processor 604. Processor 604 can be a special purpose or a general purpose processor. Examples of processor 604 are CPU 305 and GPU 335 of FIG. 3, or an APU that includes a CPU and one or more processors such as a GPU or a GPGPU. Processor 604 is connected to a communication infrastructure 606 (for example, a bus or network) such as bus 355 of FIG. 3.

Computer system 600 also includes a main memory 608, such as random access memory (RAM), and may also include a secondary memory 610. Secondary memory 610 may include, for example, a hard disk drive 612, a removable storage drive 614, and/or a memory stick. Removable storage drive 614 may comprise a floppy disk drive, a magnetic tape drive, an optical disk drive, a flash memory, or the like. The removable storage drive 614 reads from and/or writes to a removable storage unit 618 in a well-known manner. Removable storage unit 618 may comprise a floppy disk, magnetic tape, optical disk, etc. that is read by and written to by removable storage drive 614. As will be appreciated by persons skilled in the relevant art(s), removable storage unit 618 includes a computer usable storage medium having stored therein computer software and/or data.

In alternative implementations, secondary memory 610 may include other similar means for allowing computer programs or other instructions to be loaded into computer system 600. Such means may include, for example, a removable storage unit 622 and an interface 620. Examples of such means may include a program cartridge and cartridge interface (such as that found in video game devices), a removable memory chip (such as an EPROM, or PROM) and associated socket, and other removable storage units 622 and interfaces 620 that allow software and data to be transferred from the removable storage unit 622 to computer system 600.

Computer system 600 may also include a communications interface 624. Communications interface 624 allows software and data to be transferred between computer system 600 and external devices. Communications interface 624 may include a modem, a network interface (such as an Ethernet card), a communications port, a PCMCIA slot and card, or the like. Software and data transferred via communications interface 624 are in the form of signals that may be electronic, electromagnetic, optical, or other signals capable of being received by communications interface 624. These signals are provided to communications interface 624 via a communications path 626. Communications path 626 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 618, removable storage unit 622, and a hard disk installed in hard disk drive 612. Signals carried over communications path 626 can also embody the logic described herein. Computer program medium and computer usable medium can also refer to memories, such as main memory 608 and secondary memory 610, which can be memory semiconductors (e.g. DRAMs, etc.). These computer program products are means for providing software to computer system 600.

Computer programs (also called computer control logic) are stored in main memory 608 and/or secondary memory 610. Computer programs may also be received via communications interface 624. Such computer programs, when executed, enable computer system 600 to implement the embodiments as discussed herein. In particular, the computer programs, when executed, enable processor 604 to implement the disclosed processes, such as the steps in the methods 200 of FIG. 2 and 400 of FIG. 4 as discussed above. Accordingly, such computer programs represent controllers of the computer system 600. Where the embodiments are implemented using software, the software may be stored in a computer program product and loaded into computer system 600 using removable storage drive 614, interface 620, hard drive 612 or communications interface 624. This can be accomplished, for example, through the use of general-programming languages (such as C or C++), hardware-description languages (HDL) including Verilog HDL, VHDL, Altera HDL (AHDL) and so on, or other available programming and/or schematic-capture tools (such as, circuit-capture tools). The computer program code can be disposed in any known computer-readable medium including semiconductor, magnetic disk, or optical disk (such as, CD-ROM, DVD-ROM). As such, the code can be transmitted over communication networks including the Internet and internets. It is understood that the functions accomplished and/or structure provided by the systems and techniques described above can be represented in a core (such as a processing-unit core) that is embodied in program code and may be transformed to hardware as part of the production of integrated circuits.

Embodiments are also directed to computer program products comprising software stored on any computer useable medium. Such software, when executed in one or more data processing device, causes a data processing device(s) to operate as described herein. Embodiments employ any computer useable or readable medium, known now or in the future. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage device, etc.), and communication mediums (e.g., wired and wireless communications networks, local area networks, wide area networks, intranets, etc.).

It is to be appreciated that the Detailed Description section, and not the Summary and Abstract sections, is intended to be used to interpret the claims. The Summary and Abstract sections may set forth one or more but not all exemplary embodiments as contemplated by the inventor(s), and thus, are not intended to limit the disclosure and the appended claims in any way.

The disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the embodiments that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary embodiments, but should be defined only in accordance with the following claims and their equivalents.

What is claimed is:

1. A method comprising:
    determining, by a peripheral device, compute instructions that are specific to a graphics processing unit (GPU) of a first device, wherein the first device is separate from the peripheral device;
    establishing, by the peripheral device, a common memory storage area in the first device;
    storing, by the peripheral device, the compute instructions in a command queue of the first device for acquisition by the GPU; and
    storing, by the peripheral device, captured data in the common memory storage area, wherein the captured data is captured by the peripheral device for the GPU to perform tasks on the captured data based on the compute instructions acquired from the command queue.

2. The method according to claim 1, wherein the compute instructions further comprise a human-computer interface (HCI) compute function.

3. The method according to claim 2, wherein the HCI compute function includes at least one of face tracking, eye tracking, hand tracking, and finger tracking.

4. The method according to claim 2, wherein the compute instructions further comprise generating visual feedback of results of the HCI compute function on a display.

5. The method according to claim 4, wherein the visual feedback is an overlay on top of regular screen content.

6. The method according to claim 5, wherein the visual feedback is presented with per-pixel alpha blending.

7. The method according to claim 1, wherein the peripheral device is a camera.

8. A peripheral device, comprising:
    a communications interface;
    a data acquisition device; and
    an embedded processor communicatively coupled to the communications interface, and data acquisition device;
    wherein the embedded processor:
    determines, using firmware, compute instructions that are specific to a graphics processing unit (GPU) of a first device, wherein the first device is separate from and communicatively coupled to the peripheral device;
    establishes, using the communication interface, a common memory storage area in the first device based on the firmware;
    stores, using the communication interface, the compute instructions in a command queue of the first device;
    stores, using the communication interface, captured data in the common memory storage area, wherein the captured data is captured by the data acquisition device;
    causes, using the communication interface, the GPU of the first device to acquire the compute instructions and perform tasks on the captured data based on the compute instructions stored in the command queue.

9. The peripheral device according to claim 8, wherein the compute instructions further comprise a human-computer interface (HCI) compute function.

10. The peripheral device according to claim 9, wherein the HCI compute function includes at least one of face tracking, eye tracking, hand tracking, and finger tracking.

11. The peripheral device according to claim 9, wherein the compute instructions further comprise generating visual feedback of results of the HCI compute function on a display.

12. The peripheral device according to claim 11, wherein the visual feedback is an overlay on top of regular screen content.

13. The peripheral device according to claim 12, wherein the visual feedback is presented with per-pixel alpha blending.

14. The peripheral device according to claim 8, wherein the data acquisition device is a camera.

15. A Graphics Processing Unit (GPU),
    the GPU communicatively coupled to a common memory storage area and a GPU command queue, wherein the GPU:
    retrieves, from the command queue, compute instructions that are specific to the GPU, wherein the compute instructions are inserted in the command queue by a peripheral device that determines the compute instructions based on firmware of the peripheral device;
    acquires captured data, captured by the peripheral device, in the common memory storage area; and
    performs tasks on the captured data based on the compute instructions retrieved from the command queue.

16. The GPU according to claim 15, wherein the compute instructions further comprise a human-computer interface (HCI) compute function.

17. The GPU according to claim 16, wherein the HCI compute function includes at least one of face tracking, eye tracking, hand tracking, and finger tracking.

18. The GPU according to claim 17, wherein the compute instructions further comprise generating visual feedback of results of the HCI compute function on a display.

19. The GPU according to claim 18, wherein the visual feedback is an overlay on top of regular screen content.

20. The GPU according to claim 15, wherein the peripheral device is a camera.

* * * * *